United States Patent
Sturman

(10) Patent No.: US 11,073,070 B2
(45) Date of Patent: Jul. 27, 2021

(54) LIQUID AND GASEOUS MULTI-FUEL COMPRESSION IGNITION ENGINES

(71) Applicant: Sturman Digital Systems, LLC, Woodland Park, CO (US)

(72) Inventor: Oded Eddie Sturman, Woodland Park, CO (US)

(73) Assignee: Sturman Digital Systems, LLC, Woodland Park, CO (US)

( * ) Notice: Subject to any disclaimer, the term of this patent is extended or adjusted under 35 U.S.C. 154(b) by 0 days.

(21) Appl. No.: 16/433,712

(22) Filed: Jun. 6, 2019

(65) Prior Publication Data

US 2019/0284987 A1 Sep. 19, 2019

Related U.S. Application Data

(60) Division of application No. 15/284,292, filed on Oct. 3, 2016, now Pat. No. 10,352,228, which is a
(Continued)

(51) Int. Cl.
  *F02B 1/14* (2006.01)
  *F02D 41/30* (2006.01)
  (Continued)

(52) U.S. Cl.
  CPC ............ *F02B 1/14* (2013.01); *F02B 1/12* (2013.01); *F02B 7/00* (2013.01); *F02B 7/04* (2013.01);
  (Continued)

(58) Field of Classification Search
  CPC ...... F02B 1/14; F02B 1/12; F02B 7/00; F02B 7/04; F02B 7/08; F02B 21/00;
  (Continued)

(56) References Cited

U.S. PATENT DOCUMENTS 2,442,664 A   6/1948   Roensch
2,614,546 A   10/1952  Schwarz
(Continued)

FOREIGN PATENT DOCUMENTS

CA   2838120        3/2014
DE   102009029808   10/2010
(Continued)

OTHER PUBLICATIONS

"International Search Report and Written Opinion of the International Searching Authority dated Jun. 23, 2015; International Application No. PCT/US2015/024378", dated Jun. 23, 2015.
(Continued)

*Primary Examiner* — John Kwon
*Assistant Examiner* — Johnny H Hoang
(74) *Attorney, Agent, or Firm* — Womble Bond Dickinson (US) LLP

(57) ABSTRACT

Methods of operation of liquid and gaseous multi-fuel compression ignition engines that may be operated on a gaseous fuel or a liquid fuel, or a combination of both a gaseous fuel and a liquid fuel at the same time and in some embodiments, in the same combustion event. Various embodiments are disclosed.

10 Claims, 8 Drawing Sheets

Related U.S. Application Data continuation of application No. PCT/US2015/024378, filed on Apr. 3, 2015.

(60) Provisional application No. 61/974,937, filed on Apr. 3, 2014.

(51) Int. Cl.

| | | |
|---|---|---|
| *F02B 1/12* | (2006.01) | |
| *F02B 7/00* | (2006.01) | |
| *F02B 21/00* | (2006.01) | |
| *F02B 33/22* | (2006.01) | |
| *F02B 43/00* | (2006.01) | |
| *F02B 67/04* | (2006.01) | |
| *F02D 19/10* | (2006.01) | |
| *F02D 13/02* | (2006.01) | |
| *F02D 19/06* | (2006.01) | |
| *F02D 41/40* | (2006.01) | |
| *F02D 41/00* | (2006.01) | |
| *F02B 7/04* | (2006.01) | |
| *F02B 7/08* | (2006.01) | |
| *F02B 33/00* | (2006.01) | |
| *F02B 43/10* | (2006.01) | |
| *F02B 75/02* | (2006.01) | |
| *F02D 41/38* | (2006.01) | |
| *F02M 61/14* | (2006.01) | |

(52) U.S. Cl.
CPC .............. *F02B 7/08* (2013.01); *F02B 21/00* (2013.01); *F02B 33/00* (2013.01); *F02B 33/22* (2013.01); *F02B 43/00* (2013.01); *F02B 43/10* (2013.01); *F02B 67/04* (2013.01); *F02B 75/02* (2013.01); *F02D 13/0276* (2013.01); *F02D 19/061* (2013.01); *F02D 19/0689* (2013.01); *F02D 19/0692* (2013.01); *F02D 19/10* (2013.01); *F02D 41/0025* (2013.01); *F02D 41/0027* (2013.01); *F02D 41/3058* (2013.01); *F02D 41/38* (2013.01); *F02D 41/402* (2013.01); *F02M 61/14* (2013.01); *F02B 2043/103* (2013.01); *F02B 2075/025* (2013.01); *F02B 2075/027* (2013.01); *F02B 2201/06* (2013.01); *F02D 41/008* (2013.01); *F02D 2041/389* (2013.01); *F02D 2400/02* (2013.01); *F02D 2400/04* (2013.01); *Y02T 10/12* (2013.01); *Y02T 10/30* (2013.01); *Y02T 10/40* (2013.01)

(58) Field of Classification Search
CPC .......... F02B 33/00; F02B 33/22; F02B 43/00; F02B 43/10; F02B 67/04; F02B 75/02; F02B 2201/06; F02D 13/0276; F02D 19/061; F02D 19/0689; F02D 19/0692; F02D 19/10; F02D 41/0025; F02D 41/008; F02D 41/0027; F02D 41/3058; F02D 41/38; F02D 41/402; F02D 2041/389; F02D 2043/103; F02D 2040/02
USPC .................. 123/1 A, 27 R, 27 GE, 294, 299, 123/525–527, 575–577
See application file for complete search history.

(56) References Cited

U.S. PATENT DOCUMENTS

| | | |
|---|---|---|
| 3,168,083 A | 2/1965 | Buchanan |
| 3,637,332 A | 1/1972 | McAnally, III |
| 3,964,452 A | 6/1976 | Nakamura et al. |
| 4,572,116 A | 2/1986 | Hedelin |
| 4,890,585 A | 1/1990 | Hathorn |
| 5,101,776 A | 4/1992 | Ma |
| 5,341,771 A | 8/1994 | Riley |
| 5,460,329 A | 10/1995 | Sturman |
| 5,638,781 A | 6/1997 | Sturman |
| 5,713,316 A | 2/1998 | Sturman |
| 5,720,261 A | 2/1998 | Sturman et al. |
| 5,829,396 A | 11/1998 | Sturman |
| 5,842,453 A | 12/1998 | Hedelin |
| 5,954,030 A | 9/1999 | Sturman et al. |
| 5,960,753 A | 10/1999 | Sturman |
| 5,970,956 A | 10/1999 | Sturman |
| 6,012,644 A | 1/2000 | Sturman et al. |
| 6,085,991 A | 7/2000 | Sturman |
| 6,148,778 A | 11/2000 | Sturman |
| 6,161,770 A | 12/2000 | Sturman |
| 6,173,685 B1 | 1/2001 | Sturman |
| 6,257,499 B1 | 7/2001 | Sturman |
| 6,308,690 B1 | 10/2001 | Sturman |
| 6,360,728 B1 | 3/2002 | Sturman |
| 6,415,749 B1 | 7/2002 | Sturman et al. |
| 6,427,643 B1 | 8/2002 | Dixon |
| 6,463,907 B1 | 10/2002 | Hiltner |
| 6,557,506 B2 | 5/2003 | Sturman |
| 6,575,126 B2 | 6/2003 | Sturman |
| 6,675,748 B2 | 1/2004 | Ancimer et al. |
| 6,739,293 B2 | 5/2004 | Turner et al. |
| 6,840,211 B2 | 1/2005 | Takahashi |
| 6,910,459 B2 | 6/2005 | Sun et al. |
| 7,025,326 B2 | 4/2006 | Lammert et al. |
| 7,032,574 B2 | 4/2006 | Sturman |
| 7,108,200 B2 | 9/2006 | Sturman |
| 7,182,068 B1 | 2/2007 | Sturman et al. |
| 7,341,028 B2 | 3/2008 | Klose et al. |
| 7,387,095 B2 | 6/2008 | Babbitt et al. |
| 7,412,969 B2 | 8/2008 | Pena et al. |
| 7,418,955 B1 | 9/2008 | Hankins |
| 7,568,632 B2 | 8/2009 | Sturman |
| 7,568,633 B2 | 8/2009 | Sturman |
| 7,694,891 B2 | 4/2010 | Sturman |
| 7,717,359 B2 | 5/2010 | Sturman |
| 7,730,858 B2 | 6/2010 | Babbitt et al. |
| 7,793,638 B2 | 9/2010 | Sturman |
| 7,954,472 B1 | 6/2011 | Sturman |
| 7,958,864 B2 | 6/2011 | Sturman |
| 8,196,844 B2 | 6/2012 | Kiss et al. |
| 8,282,020 B2 | 10/2012 | Kiss et al. |
| 8,327,831 B2 | 12/2012 | Sturman |
| 8,342,153 B2 | 1/2013 | Sturman |
| 8,366,018 B1 | 2/2013 | Giordano et al. |
| 8,579,207 B2 | 11/2013 | Sturman |
| 8,596,230 B2 | 12/2013 | Sturman et al. |
| 8,628,031 B2 | 1/2014 | Kiss |
| 8,629,745 B2 | 1/2014 | Sturman et al. |
| 8,733,671 B2 | 5/2014 | Sturman |
| 9,181,890 B2 | 11/2015 | Sturman |
| 2002/0017573 A1 | 2/2002 | Sturman |
| 2002/0023625 A1 | 2/2002 | Sturman |
| 2002/0023626 A1 | 2/2002 | Sturman |
| 2002/0040692 A1 | 4/2002 | LaPointe et al. |
| 2002/0166515 A1 | 11/2002 | Ancimer et al. |
| 2003/0015155 A1 | 1/2003 | Turner et al. |
| 2004/0065854 A1 | 4/2004 | Lammert et al. |
| 2004/0103874 A1 | 6/2004 | Takahashi |
| 2004/0188537 A1 | 9/2004 | Sturman |
| 2004/0237928 A1 | 12/2004 | Sun et al. |
| 2004/0238657 A1 | 12/2004 | Sturman |
| 2005/0211201 A1 | 9/2005 | Klose et al. |
| 2005/0263116 A1 | 12/2005 | Babbitt et al. |
| 2006/0150931 A1 | 7/2006 | Sturman |
| 2006/0157581 A1 | 7/2006 | Kiss et al. |
| 2006/0192028 A1 | 8/2006 | Kiss |
| 2007/0007362 A1 | 1/2007 | Sturman |
| 2007/0113906 A1 | 5/2007 | Sturman et al. |
| 2007/0245982 A1 | 10/2007 | Sturman |
| 2007/0246014 A1 | 10/2007 | Pena et al. |
| 2008/0087738 A1 | 4/2008 | Sturman |
| 2008/0236525 A1 | 10/2008 | Babbitt et al. |
| 2008/0264393 A1 | 10/2008 | Sturman |
| 2008/0277504 A1 | 11/2008 | Sturman |

(56) References Cited

U.S. PATENT DOCUMENTS

| | | |
|---|---|---|
| 2009/0183699 A1 | 7/2009 | Sturman |
| 2009/0199819 A1 | 8/2009 | Sturman |
| 2009/0212126 A1 | 8/2009 | Sturman |
| 2010/0012745 A1 | 1/2010 | Sturman |
| 2010/0024750 A1 | 2/2010 | Atalla |
| 2010/0186716 A1 | 7/2010 | Sturman |
| 2010/0229838 A1 | 9/2010 | Sturman |
| 2010/0263645 A1 | 10/2010 | Scuderi |
| 2010/0277265 A1 | 11/2010 | Sturman et al. |
| 2011/0083643 A1 | 4/2011 | Sturman et al. |
| 2011/0155097 A1 | 6/2011 | Matsumura et al. |
| 2011/0163177 A1 | 7/2011 | Kiss |
| 2012/0031383 A1 | 2/2012 | Stockhausen |
| 2012/0080110 A1 | 4/2012 | Kiss et al. |
| 2012/0080536 A1 | 4/2012 | Parrish et al. |
| 2013/0075498 A1 | 3/2013 | Sturman |
| 2014/0138454 A1 | 5/2014 | Sturman |
| 2015/0075492 A1 | 3/2015 | Glugla et al. |
| 2015/0167576 A1 | 6/2015 | Glugla et al. |
| 2015/0198083 A1* | 7/2015 | Bandyopadhyay ............ F02D 13/0203 123/304 |
| 2015/0252695 A1 | 9/2015 | Bandyopadhyay et al. |
| 2016/0169133 A1* | 6/2016 | Yeager ................ F02D 41/0027 123/435 |
| 2017/0002800 A1* | 1/2017 | Bean ....................... F04B 53/14 |

FOREIGN PATENT DOCUMENTS

| | | |
|---|---|---|
| WO | WO-2012/028941 | 3/2012 |
| WO | WO-2013/022630 | 2/2013 |
| WO | WO-2016/196839 | 12/2016 |

OTHER PUBLICATIONS

Jun, Daesu et al., "A Study of High Combustion Efficiency and Low CO Emission in a Natural Gas HCCI Engine", SAE Technical Paper Series No. 2004-01-1974, Fuels & Lubricants Meeting & Exhibition, Toulouse, France, Jun. 8-10, 2004, 13 pp. total.

Office Action dated Jan. 29, 2020; Indian Patent Application No. 201647034448 (Jan. 29, 2020).

Office Action dated Jan. 31, 2020; United Kingdom Patent Application No. 1618570.4 (Jan. 31, 2020).

* cited by examiner

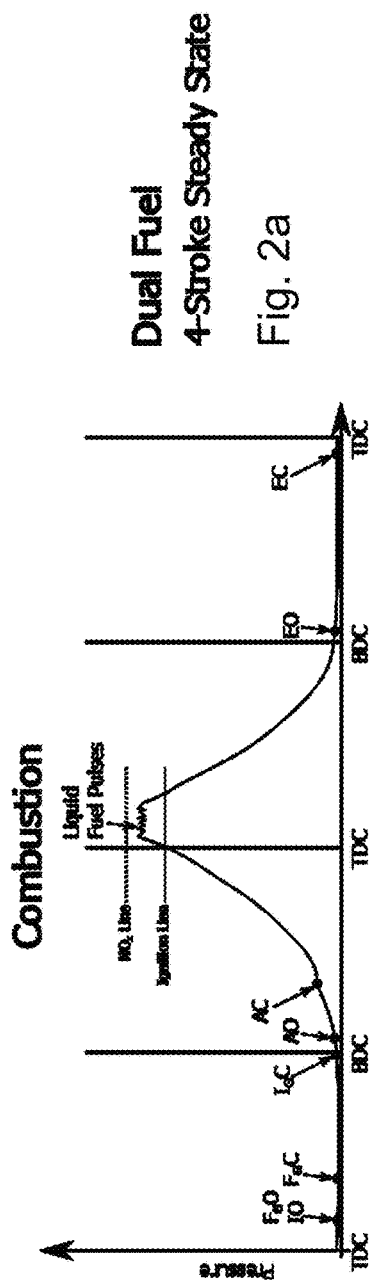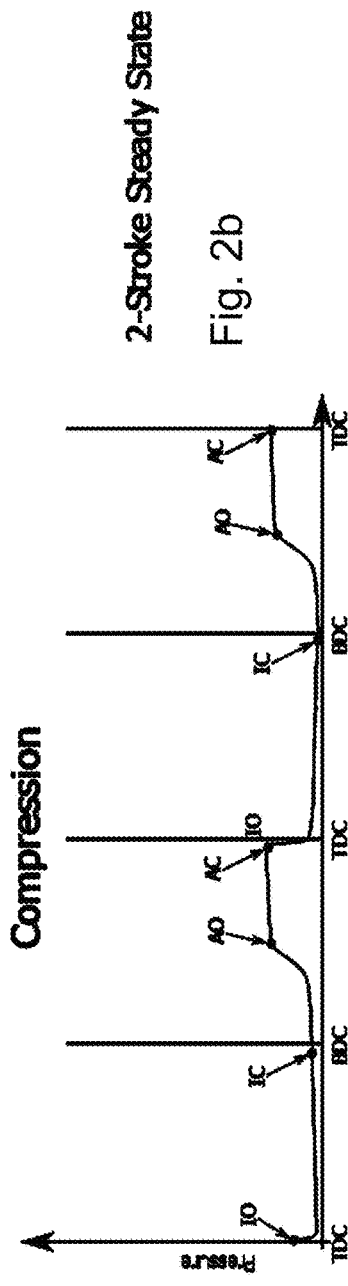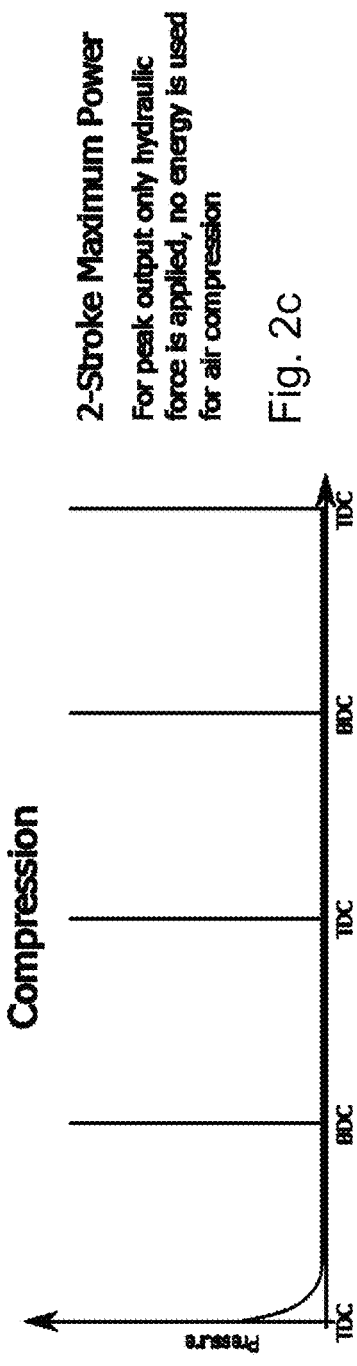

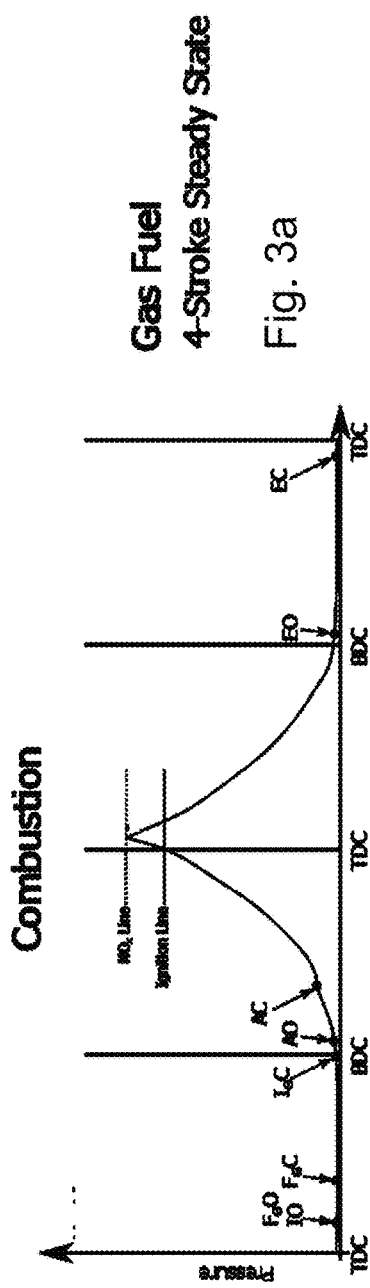
Fig. 3a — Gas Fuel 4-Stroke Steady State
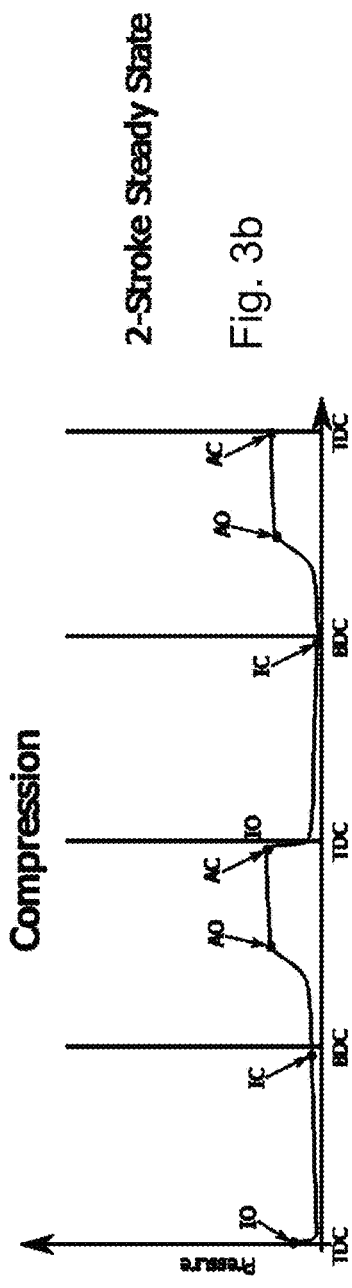
Fig. 3b — 2-Stroke Steady State
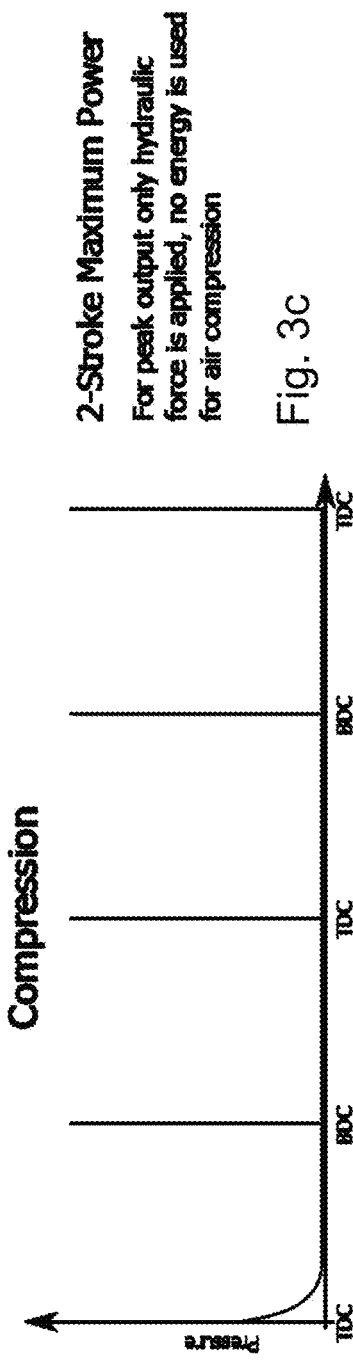
Fig. 3c — 2-Stroke Maximum Power. For peak output only hydraulic force is applied, no energy is used for air compression

LIQUID AND GASEOUS MULTI-FUEL COMPRESSION IGNITION ENGINES

CROSS-REFERENCE TO RELATED APPLICATIONS

This application is a divisional of U.S. patent application Ser. No. 15/284,292 filed Oct. 3, 2016, which is a continuation of International Application No. PCT/US2015/024378 filed Apr. 3, 2015 which claims the benefit of U.S. Provisional Patent Application No. 61/974,937 filed Apr. 3, 2014.

BACKGROUND OF THE INVENTION

1. Field of the Invention

The present invention relates to the field of compression ignition internal combustion engines.

2. Prior Art

Compression ignition engines are well known in the prior art. Such engines commonly known as diesel engines in which fuel (diesel or biodiesel) is injected into the combustion chamber after the heat of compression exceeds the self ignition temperature of the fuel, are to be distinguished from spark ignition engines wherein a fuel air mixture such as gasoline and air is compressed to below its self ignition temperature and then ignited. More recently, spark ignition of compressed natural gas (CNG) has been used in public transportation buses and the like. While such engine operation has its advantages, the current low cost of CNG being one of them, it suffers from the low volumetric energy content of the CNG, limiting the range of the vehicle.

CNG has also been used in compression ignition engines, with the ignition of the CNG being initiated by an injection of diesel fuel. This works, but also has its own disadvantages. At low power or idle, such engines run as diesel engines, at least in substantial part, thereby not taking full advantage of the low cost of CNG.

BRIEF DESCRIPTION OF THE DRAWINGS

FIG. 2a illustrates the combustion cycle of the engine of FIG. 1 when operating on both gaseous fuel and liquid fuel in the same combustion cycle and in a 4-stroke mode of operation.

FIG. 2b illustrates the operation of the compression cycles of the engine of FIG. 1 when operating on both gaseous fuel and liquid fuel.

FIG. 2c illustrates an operation of the compression cycles of the engine of FIG. 1 when the engine is operating at peak power.

FIG. 3a illustrates the combustion cycle of the engine of FIG. 1 when operating on gaseous fuel only in a 4-stroke mode of operation.

FIG. 3b illustrates the operation of the compression cycles of the engine of FIG. 1 when operating on gaseous fuel only in accordance with FIG. 3a.

FIG. 3c illustrates an operation of the compression cycles of the engine of FIG. 1 when the engine is operating for peak power on gaseous fuel only.

DETAILED DESCRIPTION OF THE PREFERRED EMBODIMENTS

Figure 1:
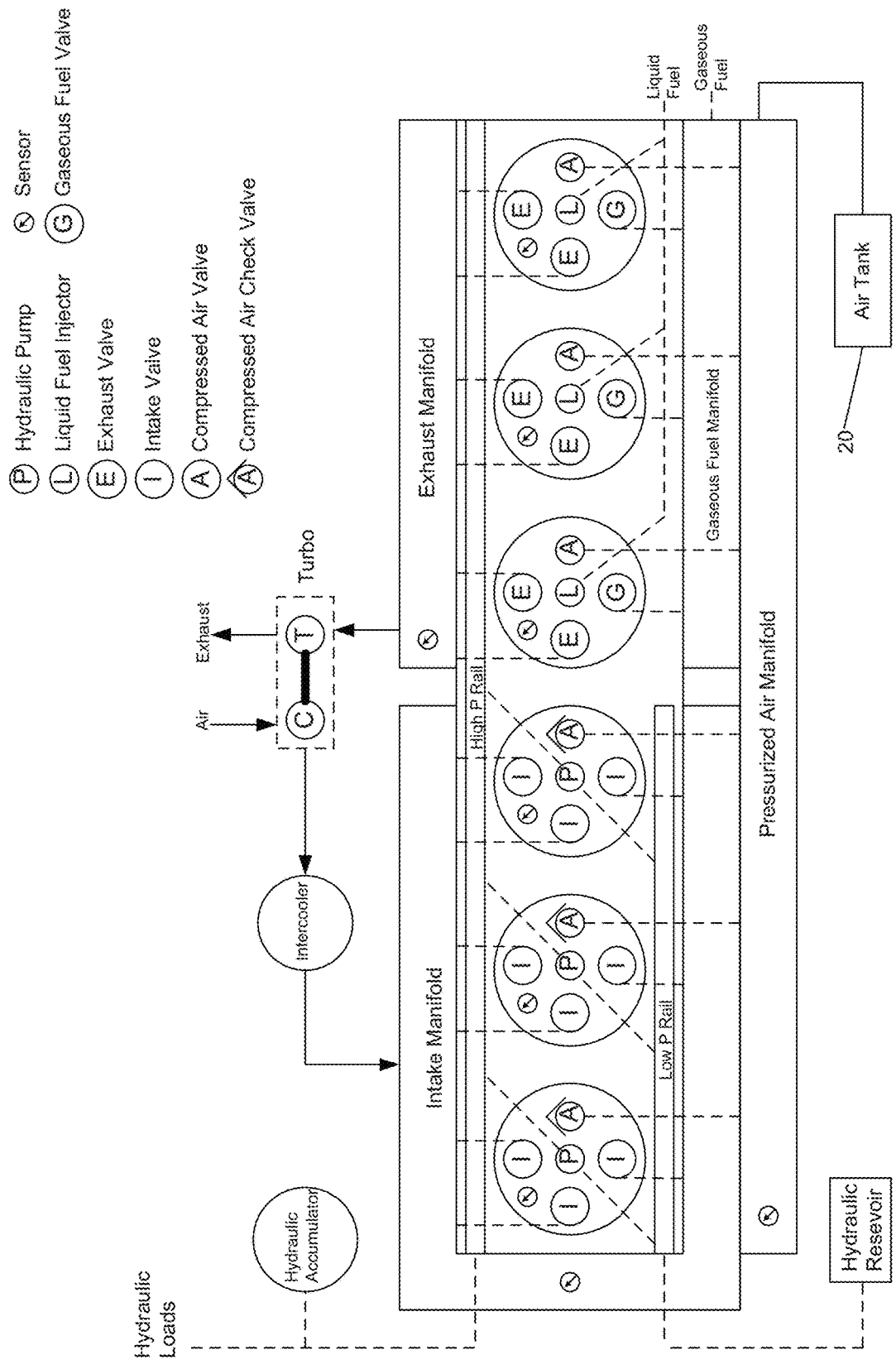
FIG. 1 is a schematic view of an engine in accordance with the present invention.

The engines described herein are internal combustion piston engines referred to as camless engines wherein engine valve operation is fully electronically controlled. Examples of electronically controlled hydraulic valve actuation systems include U.S. Pat. Nos. 5,638,781, 5,713,316, 5,960,753, 5,970,956, 6,148,778, 6,173,685, 6,308,690, 6,360,728, 6,415,749, 6,557,506, 6,575,126, 6,739,293, 7,025,326, 7,032,574, 7,182,068, 7,341,028, 7,387,095, 7,568,633 7,730,858, 8,342,153 and 8,629,745, and U.S. Patent Application Publication No. 2007/0113906. These patents and patent application disclose electronically controlled hydraulic valve actuation systems primarily intended for engine valves such as, but not limited to, conventional intake and exhaust valves, and include, among other things, methods and apparatus for control of engine valve acceleration and deceleration at the limits of engine valve travel as well as variable valve lift. However, it should be understood that other electronically controlled engine valve operating systems are also known, such as by way of example, solenoid operated and piezoelectric operated systems. Also, in the engines to be described, the fuel injectors are also fully electronically controlled, as are any other valves used in the engines. Examples of electronically controlled diesel (liquid fuel) injectors include U.S. Pat. Nos. 5,460,329, 5,720,261, 5,829,396, 5,954,030, 6,012,644, 6,085,991, 6,161,770, 6,257,499, 7,032,574, 7,108,200, 7,182,068, 7,412,969, 7,568,632, 7,568,633, 7,694,891, 7,717,359, 8,196,844, 8,282,020, 8,342,153, 8,366,018, 8,579,207, 8,628,031 and 8,733,671, and U.S. Patent Application Publication Nos. 2002/0017573, 2006/0192028, 2007/0007362, 2010/0012745, and 2014/0138454. These patents and patent applications disclose electronically controllable intensifier type fuel injectors having various configurations, and include direct needle control, variable intensification ratio, intensified fuel storage and various other features. Of course, many other electronically controlled injectors may be used as desired. The CNG injectors may be of relatively conventional design because their operating requirements are far less stringent, as no pulsing is desired, as shall be seen. Also it is to be understood that "diesel" fuel is used generally herein to indicate a liquid fuel, unless specifically limited in its context to fuels that are currently sold for use in currently available diesel engines.

Disclosed herein are liquid and gaseous multi-fuel compression ignition engines capable of operating on liquid fuels such as diesel, biodiesel, gasoline and ammonia in liquid form and other liquid fuels as desired, including jet fuels, kerosene and the like, as well as gaseous fuels including gaseous fuels that do not easily self ignite, such as natural gas and ammonia in a gaseous form, though other gaseous fuels may be used, such as propane, butane and the like. Obviously the choice of fuels to be used may be suggested or dictated by various circumstances, including cost and local availability.

The specific engine illustrated in FIG. 1 is a six cylinder engine having three cylinders on the left devoted to compressing air and three cylinders on the right devoted as combustion cylinders. Each cylinder uses four valves, typically poppet valves, and either a liquid fuel injector as in the combustion cylinders or an optional hydraulic pump in the compression cylinders.

Addressing first the compression cylinders at the left of FIG. 1, the three intake valves I are coupled to the intake manifold, with a compressed air valve A being coupled to the pressurized air manifold. At the center of the cylinder head where normally a fuel injector would be located, is a hydraulic pump, an exemplary embodiment of which will be subsequently described. The intake manifold is coupled to an exhaust powered turbocharger T which drives an air compressor C through an optional intercooler to provide supercharged air to the intake manifold.

The combustion cylinders at the right of FIG. 1 each have one air valve A for controllably receiving pressurized air from the pressurized air manifold, as well as two exhaust valves E for exhausting products of the combustion to the exhaust manifold. Each combustion cylinder also has a further valve G for receiving a gaseous fuel, and a liquid fuel injector L for injecting a liquid fuel when used. The valve G can be used as an air intake valve by simply separately shutting off the gas supply through an additional electronically controlled valve (not shown). Finally, in the embodiment shown, each cylinder includes a sensor, typically a pressure sensor, represented by the small circle with an arrow therein to provide information regarding the operation of the engine to a controller (not shown) that controls the engine. Also the intake manifold, the exhaust manifold and the pressurized air manifold each contain a sensor, so that the entire engine is instrumented in this embodiment for full control of all aspects of the engine operation by the controller.

Finally, it is essential that the operation of the various valves I, A, E and G, as well as the liquid fuel injector L, be electronically controlled so that a controller can control the operation of these various components, particularly the timing thereof, for proper operation of the engine, such as previously described.

Now referring to FIGS. 2a through 2c, operation using both a gaseous fuel and a liquid fuel in the same combustion cycle is illustrated. In these Figures, the combustion cycle begins with an intake stroke with the valve G opening (IO) and at the same time a separate gaseous fuel valve $F_{qO}$ is opened, after which the gas valve $F_g$ is closed, with any gaseous fuel left in the gaseous fuel manifold (FIG. 1) being removed from that manifold and ingested into the engine until the valve G is closed ($I_{gC}$). Otherwise the compression and ignition proceeds with ignition occurring either based on the gaseous fuel that is in the combustion chamber or by ignition of the gaseous fuel as prompted by the ignition of a very small pilot liquid fuel pulse, with subsequent liquid fuel pulses being carried out as shown. In that regard, in an experimental engine, eight fuel pulses have been used, though lesser or even a greater quantity could be used if desired. Further, of course, while FIG. 2a shows the pressure being substantially uniform during the pulsed injections, this is approximate only, as the pressure during these various injections might vary upward or downward, or both, and of course the amount of fuel injected for each pulse and the timing between pulses can also be varied, all of these various parameters being under control of the controller. For the operation of the combustion cylinder as shown in FIG. 2a, two 2-stroke compression cycles may be used in the compression cylinders as illustrated in FIG. 2b to add additional (pressurized) air to the combustion cylinders at the beginning of the compression stroke of the combustion cylinders to increase the effective compression ratio of the combustion cylinders to assure compression ignition, with the compression ignition occurring at or near the top dead center piston position by cycle to cycle adjustments in valve timing made by the controller. Bursts of power may be provided with compression being dispensed with for a short period of time, with the engine operating on pressurized air maintained in the air tank. In that regard, pressurized air may be stored in the air tank essentially free when the engine is used to power a vehicle by storing high pressure air in the air tank when using the engine for a brake.

Now referring to FIGS. 3a through 3c, operation of the engine on a single or conceivably a mixture of gaseous fuels may be seen. In FIG. 3a, the notation is the same as that used in FIG. 2a, with compression and ignition occurring much like a conventional compression ignition engine, though with using the air from the pressurized manifold, which in turn is supplied by the 2-stroke compression cycles of FIG. 3b. As before, the air from the compression cylinders effectively increases the compression ratio (and temperature attained) to assure self ignition of gaseous fuels such as compressed natural gas (CNG). Again, the engine may be operated on a temporary basis using air previously stored in the air tank (FIG. 1) by dispensing with the compression cycles as shown in FIG. 3c.

Figure 4:
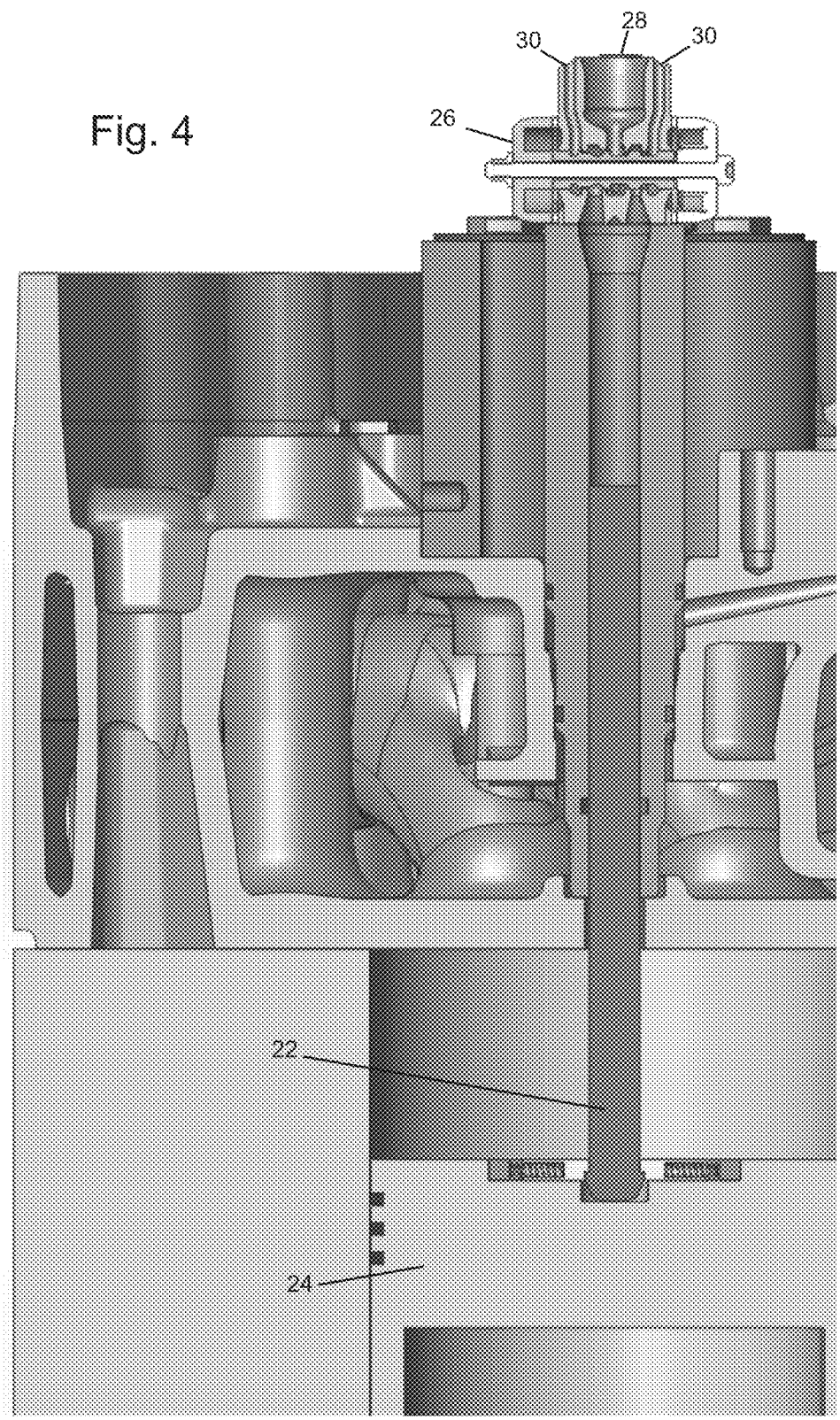
FIG. 4 is a cross sectional view of an optional hydraulic pump P as shown in FIG. 1

In FIG. 4, the hydraulic pump P (see FIG. 1) may be seen. The pump includes a pump piston 22 which is coupled to the top of the piston 24 in a respective compression cylinder and is controlled electronically through a double solenoid valve 26 receiving hydraulic fluid, preferably engine oil, through port 28 and delivering high pressure hydraulic fluid through ports 30. The pump piston 22 reciprocates with the respective compression cylinder piston 24 so as to act as a positive displacement pump. High pressure hydraulic fluid may be stored in a hydraulic accumulator (not shown) for use in valve and injector powering and for hydraulically powering any other device needing such hydraulic power, with any excess pumping capacity capability being reduced by temporarily coupling the input port 28 to the output ports 30 through appropriate valving, with flow back from the hydraulic accumulator being prevented by a check valve in that line. Such a hydraulic pump may be used to provide actuation fluid to the hydraulically actuated valves and liquid fuel injectors L, and depending on the size of the hydraulic accumulator, the double solenoid valve 26 may be operated in an opposite sense with pressure from the hydraulic accumulator being used to push the respective piston 22 down at the appropriate time to recover energy from the hydraulic accumulator, again for short bursts of power. Such storage of hydraulic energy can again be free if done when using engine braking.

In the descriptions herein it should be noted that valve actuation timing as illustrated in the various Figures is approximate and highly schematic only, and in fact, in any embodiment would be varied for such purposes as to maximize performance for power or efficiency, or even maximum engine braking, depending upon the needs of the engine output at any particular time. Further, particularly while operating on a fuel that is difficult to obtain compression ignition, additional compression cycles for each corresponding combustion cycle may be used to obtain higher compression temperatures, or alternatively, intake air could be heated with exhaust heat to obtain the required precompression temperature to reach ignition temperatures by the end of a compression stroke in the respective combustion cylinder. The actual temperatures achieved can be accurately controlled by the controller since the controller has full control over valve openings and closings, which allows the controller to increase or decrease (within reasonable limits) the amount of air, and thus its pressure and temperature, coupled to the respective combustion cylinder so that ignition is achieved either at or near top dead center, or at least if a liquid fuel is being used, at the time of initial injection of the liquid fuel. While particularly for gaseous fuels that are premixed in the combustion chamber prior to ignition, it is important that the timing of compression ignition be carefully controlled so that the compression ignition occurs, but not before the piston in the respective combustion cylinder nearly reaches or just passes its top dead center position. However it should also be noted that the timing of ignition in terms of crankshaft angle can be sensed by the respective sensor or otherwise and iterative adjustments made in the operating parameters of the engine to maintain compression ignition at the proper time in spite of changes in conditions, such as in engine temperatures or environmental conditions.

Figures 5, 7:
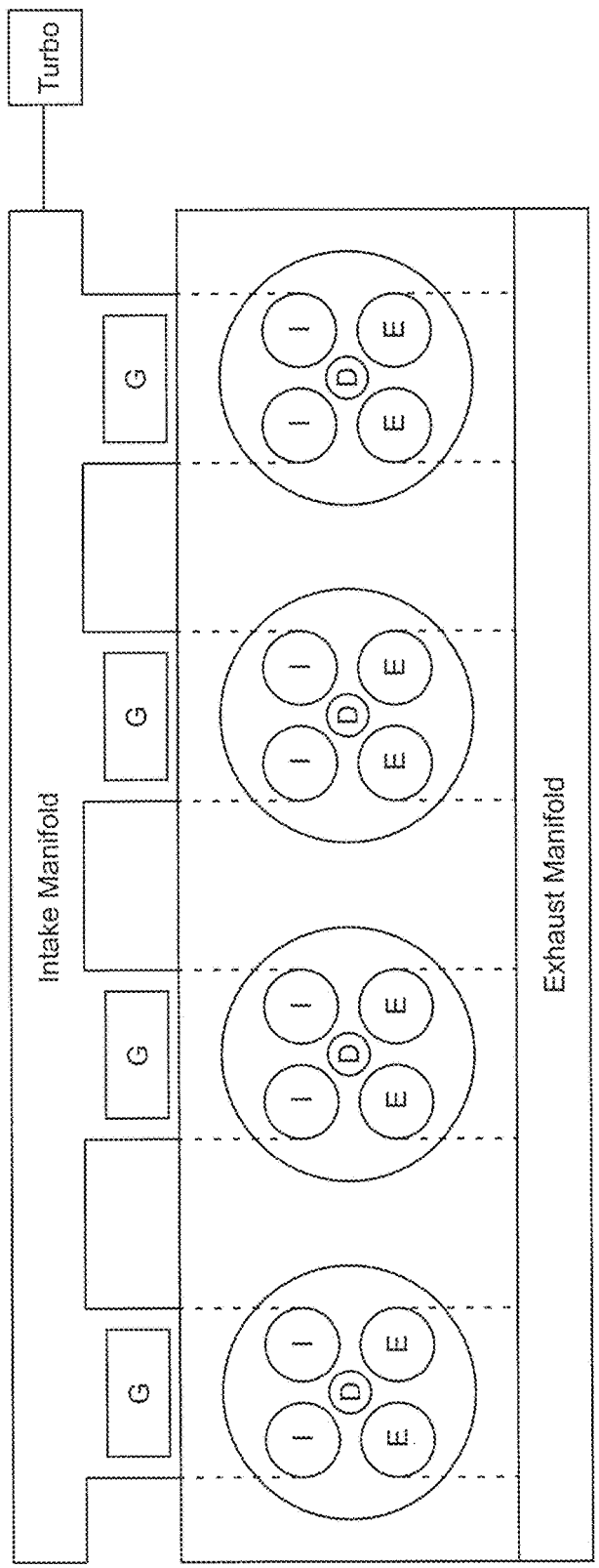
FIG. 5 is a schematic illustration of another embodiment of an engine which incorporates the present invention.
FIG. 7 defines the nomenclature used in FIG. 8 for the condition of the various valves and P for pulsing of the engine of FIG. 5.
Figure 6:
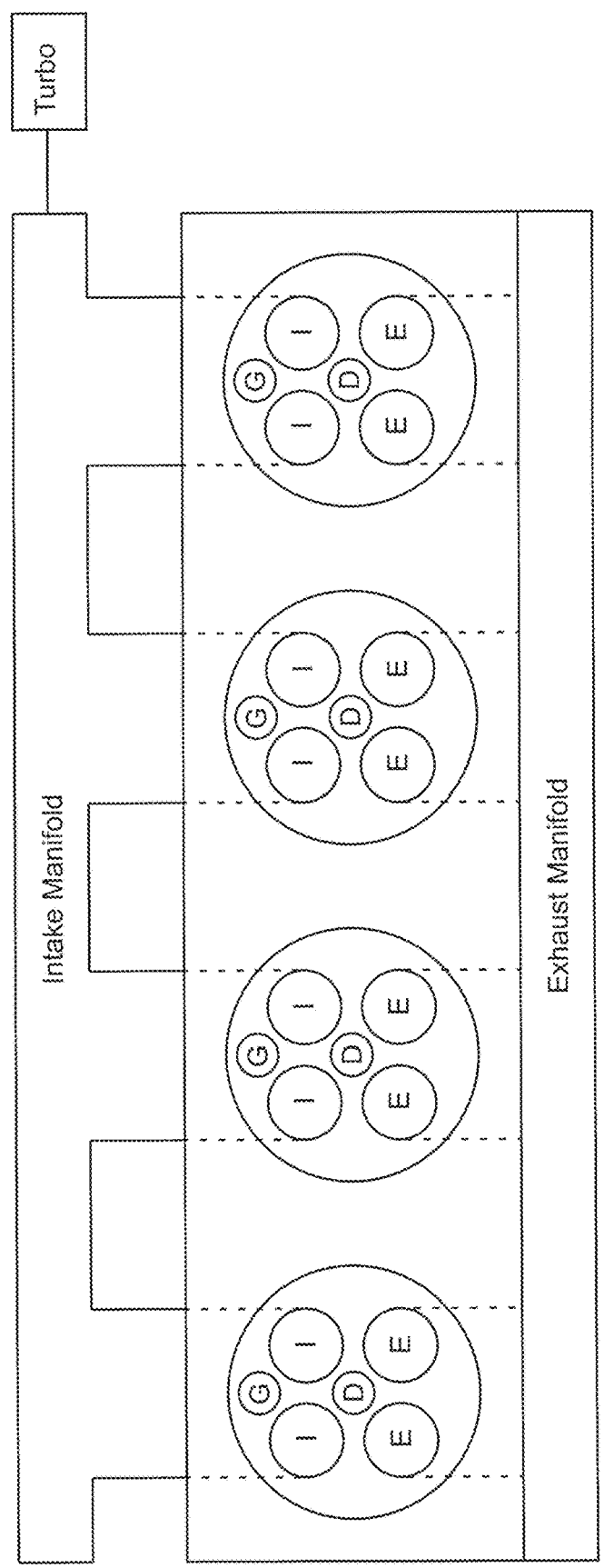
FIG. 6 is a schematic illustration of a still further embodiment, similar to FIG. 5, but with direct injection of the gaseous fuel into the combustion cylinder of the engine.

FIG. 5 is a schematic illustration of another embodiment of an engine which incorporates the present invention. As shown therein, the exemplary engine is a four cylinder engine, though may have more or fewer cylinders, as desired, as the configuration of each cylinder is the same. In particular, as shown in FIG. 1, each cylinder has a pair of intake valves I, a pair of exhaust valves E, and a diesel injector D. The intake valves I are coupled to an Intake Manifold which also includes a compressed natural gas (CNG) injector G, which might comprise a single injector for each pair of intake valves I, or alternatively, which might be used in duplicate for each cylinder with each natural gas injector serving an individual intake valve, by way of example. Also included is a conventional Exhaust Manifold. An optional turbocharger is also shown. Thus, in embodiments in accordance with FIG. 5, a premix of natural gas and air may be provided to the engine, and/or diesel fuel may be injected at the appropriate time during the operation of the engine. Alternatively, the gaseous fuel injector may be disposed to directly inject the gaseous fuel into the combustion chamber, much like the liquid fuel injector, as illustrated in FIG. 6. In this embodiment, when operating using both the liquid fuel and the gaseous fuel in the same combustion event, either or both fuels simultaneously may be used to initiate compression ignition, and either or both fuels may be used at various stages of the combustion event. When operated on only one of the fuels, the operating cycle basically replicates that of a conventional diesel engine (preferably with pulsing of the liquid fuel).

Figure 8:
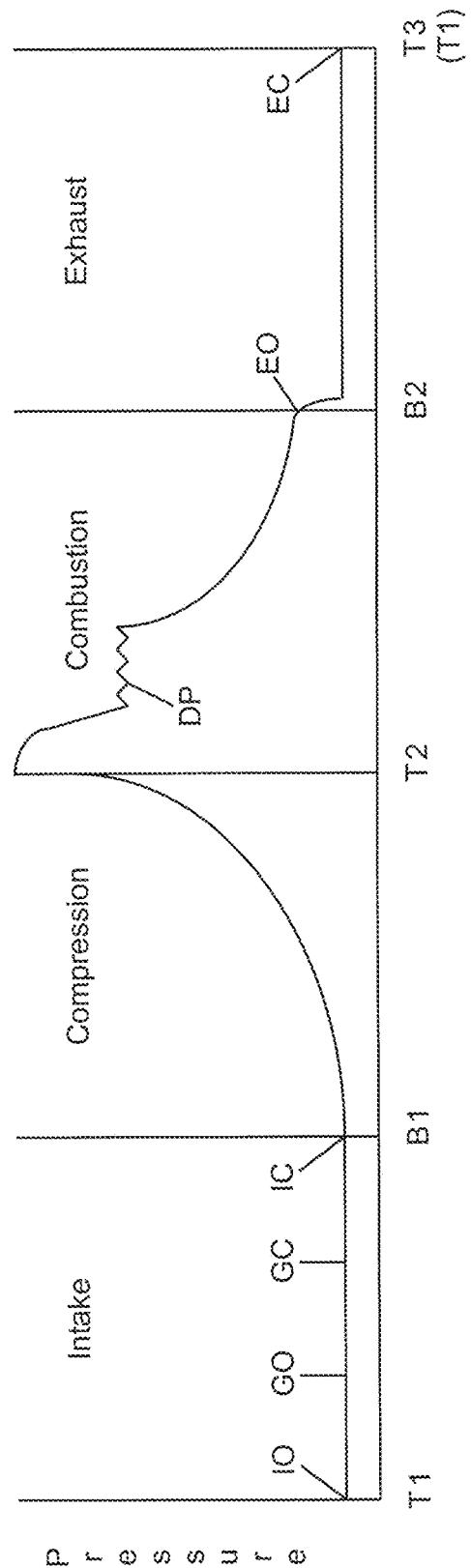
FIG. 8 illustrates an exemplary operating cycle for an engine in accordance with FIG. 5.

The various valves and injectors of the engine of FIG. 5, as hereinbefore discussed, are also identified in FIG. 7, and defines the nomenclature used in FIG. 8 for the condition of the various valves and P for pulsing.

An exemplary operating cycle for an engine in accordance with FIG. 5 may be seen in FIG. 8. This Figure, like FIG. 5, is also quite schematic, though is illustrative of the concepts of the present invention. In particular, when the piston is at or near top dead center T1, the intake valve is opened (IO), and sometime before the piston reaches the bottom dead center position B1 or even at the top dead center position T1, the CNG injector is activated or opened (GO) and then later, before or when the piston reaches the bottom dead center position B1, the CNG injector is shut off or closed (GC) to provide thoroughly mixed CNG and air in the respective cylinder. Then at the bottom dead center position B1, the intake valve is closed (IC) and compression occurs with compression ignition of the CNG air mixture occurring approximately at the top dead center position T2. In an actual operating engine, it has been found that the desired compression ignition of CNG has been reliably achieved with a compression ratio of approximately 22:1, not much above the compression ratio of conventional diesel engines. Of course, the time of compression ignition may be adjusted, by way of example, by controlling the time that the intake valve is closed (IC) during the intake stroke. Since all of the valves, including the diesel injector and CNG injector, are electronically controlled, adjustments can be made in the intake valve timing to advance or retract the occurrence of compression ignition, as required, to obtain compression ignition at or near the top dead center position T2.

For idling or light loads on the engine, operation on CNG only is highly practical. The combustion process just described is generally referred to as homogeneous charge compression ignition (HCCI) and can be used up to a certain proportion of CNG, above which temperatures may exceed the temperature above which $NO_x$ is created. Thus for higher power outputs of the engine, in the embodiment being described, diesel fuel is injected later during the combustion (power) stroke while combustion chamber pressure and temperature are still relatively high, and of course, combustion chamber temperature is above the diesel ignition temperatures to supplement the power output of the respective cylinder.

It will be noted in FIG. 8 that the diesel injector is pulsed (DP), the pulsing starting some crankshaft angle past the top dead center position. This is intentional, and improves the engine performance. In particular, the pressure energy conversion to mechanical energy is substantially zero at or very near top dead center, as there is a significant crankshaft angle at and near the top dead center position for which the piston position changes very little. To the extent the pressure remains until the piston is moving more, that energy will be more efficiently recovered. However heat transfer to the combustion chamber walls and increases in friction due to the very high loads on the piston and crankshaft cause a substantial loss of energy at and around the top dead center piston position after ignition. Consequently in accordance with the present invention, the start of the diesel injection is delayed until there is a more favorable crankshaft angle for conversion of pressure energy to mechanical energy. The timing of the start of the pulsed injections will vary with engine operating conditions, such as load, etc., but can be adjusted cycle to cycle to operate at the most efficient or most power output, or even somewhere between these two conditions depending on the engine operating requirements.

With respect to the pulsing of the diesel injector, it has been found that a boundary layer tends to build up around the injected fuel, which boundary layer will contain a stoichiometric or near stoichiometric fuel/air ratio that on ignition can very locally reach $NO_x$ generating temperatures. By pulsing the injections, each pulse of fuel initiates its own boundary layer, rather than building on the boundary layer of the previously injected fuel. This results in much reduced boundary layer thicknesses, allowing better conduction of heat generated in the stoichiometric or near stoichiometric fuel/air ratio region of the boundary layer to be conducted either to the cooler fuel rich regions of the fuel spray or the adjacent cooler combustion chamber contents. Accordingly the pulsing is ideal for maintaining the desired combustion chamber temperatures and pressures, and does so throughout a larger crankshaft angle for better conversion of the energy in the combustion chamber contents to mechanical energy, while at the same time substantially eliminating the generation of any $NO_x$, whether by overall or local combustion chamber temperatures, while more completely using the available oxygen in the combustion chamber. In operating engines, 8 to 12 pulses per combustion cycle have been used.

After the pulsing of the diesel injector ceases, the remainder of the combustion stroke or power stroke (combustion event) will be conventional, with the exhaust valve opening (EO) at or near the bottom dead center position B2 and closing at the top dead center position T3, which is the top dead center position T1 for the next cycle, at which the intake valve opens (IO).

As schematically shown in FIG. 8, the pulsing of the diesel injectors begins at sometime after ignition when the spike in combustion chamber pressure and temperature has peaked and started to decline. The duration of each pulse and the repetition rate of the pulses may vary with engine operating conditions, even within each pulse sequence. Also while the pulsing of the injection is illustrated as maintaining combustion chamber pressure during the pulsing, this is schematic only, as the pressure may decrease (or conceivably increase) during the pulsing. The start of pulsing will vary with engine operating conditions, and may extend out to crankshaft angles wherein the connecting rod and crank arm are at ninety degrees to each other, or even beyond.

In FIG. 8, the pulsing of the injector is illustrated as starting at a temperature just below the temperature at which self ignition of the CNG occurs. Again this is schematic only, but is an option when using diesel fuel because of its relatively low self ignition temperature compared to CNG. However it should be recognized that the present invention is not limited to the use of what is commonly referred to a diesel fuel as the liquid fuel, as substantially any liquid fuel may be used as desired. Thus any liquid fuel may be used in place of diesel fuel in the foregoing description. If the liquid fuel should happen to have a self ignition temperature above the self ignition temperature of CNG, then the injection (pulsed or not) should start before the combustion chamber temperature decreases to the liquid fuel's self ignition temperature. One such liquid fuel is ammonia ($NH_3$), which has a self ignition temperature well above the self ignition temperature of CNG. If ammonia is used as the liquid fuel, its injection would start sometime between the peak temperature and pressure caused by the self ignition of the CNG, and the self ignition temperature of the ammonia. In the case of using a fuel like diesel that exhibits a time delay before self igniting due to the time delay of the injected fuel reaching the self ignition temperature or other causes, the first pulse may be provided as a pilot injection, with the next train of pulses following after the appropriate time delay.

In many applications, such as transportation, a vehicle's engine is frequently operating at a low load or at idle, in which case the HCCI operation using low cost CNG only will provide adequate power without any use of the liquid fuel injection. At the other end of the spectrum, the limited vehicle range caused by relative low energy content of CNG on a volumetric basis is countered using the present invention by operating the engine as a conventional diesel engine with no CNG use when required, as the achievable compression ratios attainable in the engines used with the present invention are well above the self ignition temperatures of diesel fuel, including biodiesel fuels. Normal operation at substantial loads would use both for ignition and diesel for power enhancement.

Thus the limited range of CNG powered vehicles may be extended to the range of an engine operating on diesel fuel. Also of course, one may use less than the maximum CNG possible before initiating the use of the liquid fuel, so long as the temperature existing in the combustion chamber is high enough to ignite the liquid fuel when first introduced. For cold starting of engines in accordance with the present invention, one could preheat the intake air for compression ignition of the CNG if required, or start the engine on diesel fuel using a standard diesel cycle, and then switch to CNG as the fuel for compression ignition. The engines themselves could also be free piston engines, such as those of U.S. Pat. No. 8,596,230.

In embodiments of the present invention, any pilot injection of the liquid fuel such as diesel or biodiesel fuel may be at or near the top dead center position of the piston as described, or may be at any time during the compression stroke of the piston of the combustion cylinder, or even during the intake stroke of that piston. Such a pilot injection provides a very lean premix of liquid fuel and air at least during the latter portion of the compression stroke of the combustion cylinder that will ignite before the piston reaches top dead center. This, together with the remaining part of the compression stroke, will provide adequate combustion cylinder temperature to ignite substantially any gaseous fuel that is injected at or after the top dead center piston position is reached. While such pre-ignition during the compression stroke increases the mechanical energy required to complete the compression stroke, the additional energy is substantially less than that that would have been required to compress intake air from a relatively low pressure and temperature to a temperature corresponding to that achieved by such a pilot injection.

Figure 9:
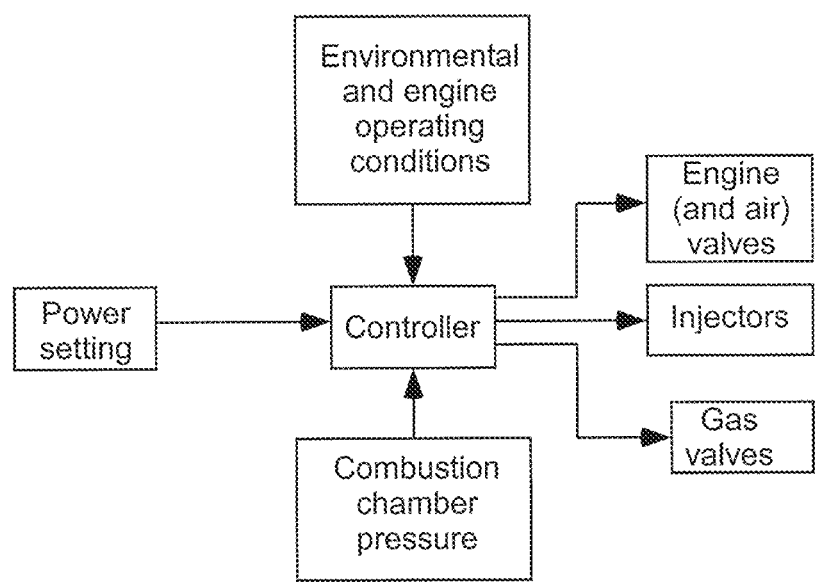
FIG. 9 is a block diagram of an exemplary controller for the engines of the present invention.

Now referring to FIG. 9, a block diagram of an exemplary controller for the engines of the present invention may be seen. The controller may receive a power setting input, as well as inputs regarding environmental and engine operating conditions (temperatures, pressures, engine RPM, etc.) and combustion chamber pressure signals, and typically together with various lookup tables within the controller, provide controls for the engine (and air) valves, the injectors and the gas valves. The controller may be programmed to make corrections in compression ratios, fuel injections, etc. to provide the power commanded by the power setting, to provide the compression ignition at the desired time, to provide a balance between cylinders and to provide the most efficient engine operation when possible, and to provide maximum power when required.

Thus the present invention has a number of aspects, which aspects may be practiced alone or in various combinations or sub-combinations, as desired. While certain preferred embodiments of the present invention have been disclosed and described herein for purposes of illustration and not for purposes of limitation, it will be understood by those skilled in the art that various changes in form and detail may be made therein without departing from the spirit and scope of the invention.

What is claimed is:

1. A method of operating a camless, electronically controlled compression ignition engine having at least one combustion cylinder having a liquid fuel injector and a gaseous fuel injector for providing a liquid fuel and gaseous fuel to the combustion cylinder, the method comprising:

activating the gaseous fuel injector to inject the gaseous fuel to the combustion cylinder during an intake stroke of the engine;

adding air to the combustion cylinder during the intake stroke of the engine to form a gaseous fuel and air mixture;

compressing the gaseous fuel and air mixture when a piston in the combustion cylinder is at or near a top dead center position; and pulsing, starting at a crankshaft angle past the top dead center position, the liquid fuel injector to inject the liquid fuel, in a series of injection pulses, to the combustion cylinder during a combustion stroke of the engine;

wherein the gaseous fuel is compressed natural gas.

2. The method of claim 1 wherein compression ignition is initiated by injection of the gaseous fuel.

3. The method of claim 1 wherein compression ignition is initiated by injection of the liquid fuel.

4. The method of claim 1 wherein compression ignition is initiated by simultaneous injection of both the gaseous fuel and the liquid fuel.

5. The method of claim 1 wherein the liquid fuel is diesel fuel, biodiesel fuel, gasoline, ammonia in liquid form, or jet fuel.

6. The method of claim 1 wherein each injection pulse of the liquid fuel initiates its respectively boundary layer, thereby reducing boundary layer thicknesses.

7. The method of claim 1 wherein the series of injection pulses comprises 8 to 12 pulses.

8. The method of claim 1 wherein the pulsing of the liquid fuel injector begins after ignition when a spike in combustion chamber pressure and temperature has peaked and started to decline.

9. The method of claim 1 wherein a duration of each injection pulse and a repetition rate of the injection pulses are variable.

10. The method of claim 1 wherein the pulsing of the liquid fuel injector starts at a temperature below a temperature at which self ignition of the gaseous fuel occurs.

* * * * *